(12) United States Patent
Frieden et al.

(10) Patent No.: US 7,653,660 B2
(45) Date of Patent: *Jan. 26, 2010

(54) EFFICIENTLY STORING INDENTED THREADS IN A THREADED DISCUSSION APPLICATION

(75) Inventors: Kurt Frieden, Berkeley, CA (US); Prasanna Srikhanta, San Francisco, CA (US)

(73) Assignee: BEA Systems, Inc., San Jose, CA (US)

( * ) Notice: Subject to any disclaimer, the term of this patent is extended or adjusted under 35 U.S.C. 154(b) by 395 days.

This patent is subject to a terminal disclaimer.

(21) Appl. No.: 11/617,727

(22) Filed: Dec. 29, 2006

(65) Prior Publication Data
US 2007/0106635 A1 May 10, 2007

Related U.S. Application Data

(60) Continuation of application No. 10/841,022, filed on May 7, 2004, now Pat. No. 7,171,429, which is a division of application No. 10/085,780, filed on Feb. 28, 2002, now Pat. No. 7,031,977.

(51) Int. Cl.
*G06F 17/30* (2006.01)
(52) U.S. Cl. .............................. 707/104.1; 707/1; 707/2; 707/3; 707/100; 707/101; 707/102
(58) Field of Classification Search ........................ None
See application file for complete search history.

(56) References Cited

U.S. PATENT DOCUMENTS

| | | | |
|---|---|---|---|
| 5,557,786 | A | 9/1996 | Johnson, Jr. |
| 5,724,577 | A | 3/1998 | Exley et al. |
| 5,754,755 | A | 5/1998 | Smith, Jr. |
| 5,819,271 | A | 10/1998 | Mahoney et al. |
| 5,881,379 | A | 3/1999 | Beier et al. |
| 5,894,554 | A | 4/1999 | Lowery et al. |
| 5,907,837 | A | 5/1999 | Ferrel et al. |
| 5,953,724 | A * | 9/1999 | Lowry .................. 707/102 |

(Continued)

FOREIGN PATENT DOCUMENTS

JP 2001-357051 12/2001

OTHER PUBLICATIONS

Method for Providing Personalized Information on the Web, IBM TOB, Oct. 1997, vol. 40, No. 10, pp. 3-6.

*Primary Examiner*—Sathyanarayan Pannala
(74) *Attorney, Agent, or Firm*—Townsend and Townsend and Crew, LLP

(57) ABSTRACT

A method, apparatus, and computer-readable media for retrieving records in a hierarchical set of the records having a plurality of hierarchical levels and a plurality of hierarchical depths, each of the records having a tag that is unique within the hierarchical set of the records, comprises identifying one of the records in the hierarchical set of the records; modifying the tag, thereby producing a key; indexing the hierarchical set of the records only once, thereby selecting one or more of the records within the hierarchical set of the records, wherein indexing the hierarchical set of the records only once comprises applying the key to the hierarchical set of the records; and retrieving the selected records.

12 Claims, 4 Drawing Sheets

U.S. PATENT DOCUMENTS

| | | | |
|---|---|---|---|
| 5,974,445 A | 10/1999 | Pivnichny et al. | |
| 6,014,137 A | 1/2000 | Burns | |
| 6,014,638 A | 1/2000 | Burge et al. | |
| 6,026,433 A | 2/2000 | D'Arlach et al. | |
| 6,065,120 A | 5/2000 | Laursen et al. | |
| 6,112,192 A | 8/2000 | Capek et al. | |
| 6,112,209 A * | 8/2000 | Gusack | 707/101 |
| 6,128,663 A | 10/2000 | Thomas | |
| 6,134,548 A | 10/2000 | Gottsman et al. | |
| 6,161,126 A | 12/2000 | Wies et al. | |
| 6,185,614 B1 | 2/2001 | Cuomo et al. | |
| 6,240,418 B1 | 5/2001 | Shadmon | |
| 6,327,628 B1 | 12/2001 | Anuff et al. | |
| 6,415,283 B1 * | 7/2002 | Conklin | 707/3 |
| 6,421,072 B1 * | 7/2002 | Ku et al. | 715/804 |
| 6,480,857 B1 * | 11/2002 | Chandler | 707/100 |

* cited by examiner

US 7,653,660 B2

EFFICIENTLY STORING INDENTED THREADS IN A THREADED DISCUSSION APPLICATION

PRIORITY

This application is a Continuation of U.S. patent application Ser. No. 10/841,022, filed May 7, 2004, which is a Division of U.S. patent application Ser. No. 10/085,780, filed Feb. 28, 2002, now U.S. Pat. No. 7,031,977, issued Apr. 18, 2006, all of which are hereby incorporated by reference.

BACKGROUND

The present invention relates generally to data management, and particularly to managing data stored hierarchically.

Hierarchical data sets are useful and popular. Such data sets are generally composed of multiple records. In a hierarchical set of records, a record can have multiple "children," which are related to the record and exist at a lower level of the hierarchy. Such a record is referred to as the "parent" record of the children records. The children of a record may have children, and so on, limited only by the size of the database. Within a set of children of a single record, it is often useful to order the children, such that there is a first child, a second child, and so on.

To date the utility of these hierarchical data sets has been limited by the efficiency of the tools available for managing the data. Conventional methods of storing hierarchical data in a database involve multiple expensive calls to update and/or query the database. For example, in order to select the second grandchild of a record, three queries are necessary. The first query selects the child of the record. The second query selects the first child of the child. The third query selects the second child of the child.

SUMMARY

In general, in one aspect, the invention features a method, apparatus, and computer-readable media for retrieving records in a hierarchical set of the records having a plurality of hierarchical levels and a plurality of hierarchical depths, each of the records having a tag that is unique within the hierarchical set of the records. It comprises identifying one of the records in the hierarchical set of the records; modifying the tag, thereby producing a key; indexing the hierarchical set of the records only once, thereby selecting one or more of the records within the hierarchical set of the records, wherein indexing the hierarchical set of the records only once comprises applying the key to the hierarchical set of the records; and retrieving the selected records.

Particular implementations can include one or more of the following features. Applying comprises selecting those of the records in the hierarchical set of the records having a tag that matches the key. Identifying one of the records comprises receiving a selection of the one of the records from a user; and receiving a command from the user; and wherein modifying the tag is based on the command from the user. Each of the records has one or more fields, and implementations can comprise displaying a field of each of the retrieved records on a display, wherein the position of each of the fields on the display represents the hierarchical depth and hierarchical level of the corresponding one of the retrieved records. Each tag is a number having a plurality of digits; the position of each of the digits represents one of the hierarchical depths; the value of each of the digits represents one of the hierarchical levels; and modifying the tag comprises selecting at least one of the digits according to the command from the user; and changing the value of the selected digits according to the command from the user. Each tag is a number having a plurality of digits; the position of each of the digits represents one of the hierarchical depths; the value of each of the digits represents one of the hierarchical levels; the command from the user requests retrieving the children of the identified record; and modifying the tag comprises selecting the digit corresponding to the hierarchical depth of the identified record; and setting the value of each digit corresponding to a hierarchical depth below the hierarchical depth corresponding to the selected digit to a wildcard value. Each tag is a number having a plurality of digits; the position of each of the digits represents one of the hierarchical depths; the value of each of the digits represents one of the hierarchical levels; the command from the user requests retrieving the parent of the identified record; and modifying the tag comprises selecting the digit corresponding to the hierarchical depth of the identified record; and setting the value of the selected digit to a null value. Each of the records represents one of a message and a folder.

In general, in one aspect, the invention features a method, apparatus, and computer-readable media for adding a new record to a hierarchical set of records having a plurality of hierarchical levels and a plurality of hierarchical depths, each of the records in the hierarchical set of records having a tag that is unique within the hierarchical set of records. It comprises identifying one of the records in the hierarchical set of records as the parent of the new record; modifying the tag, thereby producing a key; adding the key to the new record; and indexing the hierarchical set of records only once, thereby adding the new record to the hierarchical set of records, wherein indexing the hierarchical set of records only once comprises applying the key to the hierarchical set of records.

Particular implementations can include one or more of the following features. Identifying one of the records comprises receiving a selection of the one of the records from a user. Each tag is a number having a plurality of digits; the position of each of the digits represents one of the hierarchical depths; the value of each of the digits represents one of the hierarchical levels; the identified record represents a message; identifying one of the records further comprises receiving a command from the user that requests replying to the message; and modifying the tag comprises selecting the digit corresponding to the hierarchical depth immediately below the hierarchical depth of the identified record; and incrementing the value of the selected digit. Applying comprises selecting those of the records in the hierarchical set of the records having a tag that matches the key. Each tag includes a plurality of digits; the position of each of the digits represents one of the hierarchical depths; and the value of each of the digits represents one of the hierarchical levels.

In general, in one aspect, the invention features a method, apparatus, and computer-readable media for selecting records in a hierarchical set of the records having a plurality of hierarchical levels and a plurality of hierarchical depths, each of the records having a tag that is unique within the hierarchical set of the records. It comprises identifying one of the records in the hierarchical set of the records; modifying the tag; and indexing the hierarchical set of the records only once, thereby selecting one or more of the records within the hierarchical set of the records, wherein indexing the hierarchical set of the records only once comprises applying the modified tag to the hierarchical set of the record.

Particular implementations can include one or more of the following features. Each tag includes a plurality of digits; the position of each of the digits represents one of the hierarchical depths; and the value of each of the digits represents one of the hierarchical levels. Applying comprises selecting those of the records in the hierarchical set of the records having a tag that matches the key.

Advantages that can be seen in implementations of the invention include one or more of the following. Implementations of the present invention permit manipulation of a database representing an indented threaded discussion with only a single access of the database. For examples, messages can be added, deleted, and retrieved through a single database access such as a query or call.

The details of one or more implementations are set forth in the accompanying drawings and the description below. Other features will be apparent from the description and drawings, and from the claims.

Figure 1:
FIG. 1 shows a display of an indented threaded discussion.

The leading digit(s) of each reference numeral used in this specification indicates the number of the drawing in which the reference numeral first appears.

DETAILED DESCRIPTION

One common type of hierarchical data is an indented threaded discussion. Originally found only in Internet newsgroups, indented threaded discussions have found increasing popularity as a way to manage and display a discussion among multiple participants. Indented threaded discussion management tools are now found in consumer products such as electronic mail software programs.

FIG. 1 shows a display of an indented threaded discussion. An indented threaded discussion begins when a user posts a message 102 in a forum available to multiple users, where the posted message is not a reply to another message. Such a message is referred to herein as the "origin" message of the discussion. Any origin message constitutes the "head" of a thread. Thus message 102 is both the origin message of a discussion and the head of a thread. All replies to a message are part of the thread. Of course, a forum can have multiple discussions.

When a user posts a reply to a message, the reply is generally displayed underneath the message, and indented once. Any message having replies to it is the head of a thread. Thus a discussion can have many threads. The head of thread is indented once relative to the message to which it replies.

Message 104 is a reply to message 102. Therefore, reply 104 is displayed underneath message 102, and indented once, as shown in FIG. 1. A reply 106 to the reply 104 is indented once further. A reply 108 to the reply 106 to the reply 104 is indented once further still.

When a user posts another reply 110 to origin message 102, it is shown indented only once, and is shown beneath message 104 and its children 106 and 108. A subsequent reply 112 to origin message 102 is also shown indented once, and is shown beneath message 110. A reply 114 to message 112 is shown indented twice and beneath message 112.

A display such as the display of FIG. 1 allows a user to rapidly understand the structure of the discussion hierarchy and the place each message has in the hierarchy. The place a message has in the hierarchy can be described in terms of two dimensions of the hierarchy: level and depth. The depth of a message is the number of threads that contain the message. For example, referring to FIG. 1, the depth of message 108 is three because it is contained by the threads headed by messages 106, 104 and 102. The depth of an origin message such as message 102 is zero.

The level of a message at a particular depth represents the number of messages at that particular depth that precede that message. For example, referring to FIG. 1, the level of message 112 is three because it has a depth of one and is preceded by messages 110 and 104, both also at a depth of one. The order of precedence within each hierarchical depth can be determined by any number of factors or combinations thereof. In a threaded discussion group, the chronological order of the messages, as determined by the time and date of the posting of each message, is most commonly used. When the records in the hierarchical data set represent containers such as folders, the alphabetical order of the names of the folders can be used. In addition, the user of the display may select any field in the records, and thereby cause the contents of that field to determine the order of precedence. The level of an origin message such as message 102 is zero.

Referring again to FIG. 1, messages at a single hierarchical level, such as messages 104, 110, and 112, are shown in chronological order, while the children of a message (that is, replies to the message, replies to those replies, and so on) are shown beneath the message and above the next message at the same hierarchical level. The messages displayed to the user are generally stored in some sort of database such as a table Each row of the table represents a message. Each message has multiple fields such as subject, author, text, date of posting, and so on. Each column represents one of the fields.

Conventional tools for managing such indented threaded discussions are notoriously inefficient. Normally either multiple rows of the table must be updated upon the creation of a new message or multiple queries have to be performed to display an indented thread. The number of rows needing updates could be as large as the number of messages in the thread.

Implementations of the present invention associate a tag with each record in a hierarchical set of records, such that the tag is unique within the hierarchical set of records. The tag is generally one of the fields of the records. Table 1 depicts a portion of a database table representing the discussion of FIG. 1 according to one implementation.

TABLE 1

| Tag  | Depth | Level | Subject               |
|------|-------|-------|-----------------------|
| 0000 | 0     | 0     | Bike Rides in the Bay Area |
| 1000 | 1     | 1     | Old La Honda          |
| 1100 | 2     | 1     | re: Old La Honda      |
| 1110 | 3     | 1     | re: re: Old La Honda  |
| 2000 | 1     | 2     | Page Mill Road        |
| 3000 | 1     | 3     | The Bears Loop        |
| 3100 | 2     | 1     | re: The Bears Loop    |

Each tag is a number having a plurality of digits, one for each of the depths of the hierarchy. The hierarchy of Table 1 has four depths; thus each tag has four digits. In one implementation, the digits are arranged so that the most significant digit represents the first depth of the hierarchy (that is, the depth of the origin message), the next most significant digit represents the second depth of the hierarchy, and so on. Other implementations employ other arrangements of the digits.

The value of each digit represents a level in the hierarchy. Assume the hierarchy of Table 1 has four levels. Then each digit can have a values ranging from zero to three. A value of zero indicates that the message does not exist at that depth in the hierarchy. Of course, other ranges of levels and depths can be supported, as will be apparent to one skilled in the relevant art after reading this description. One implementation supports 16 levels and 16 depths. In that implementation, the tag is a 16-digit hexadecimal number represented by a "big int," a signed 64-bit number having values ranging from $-2.^{63}$ to $2.^{63}$.

Each tag uniquely identifies the position of its record in the hierarchy. For example, the tag "3100" shows that the record is the first child of the third child of the origin message.

One advantage of the disclosed tag is that the tag of a record may be determined quickly and easily, without indexing the database, by modifying the tag of a related record.

Figure 2:
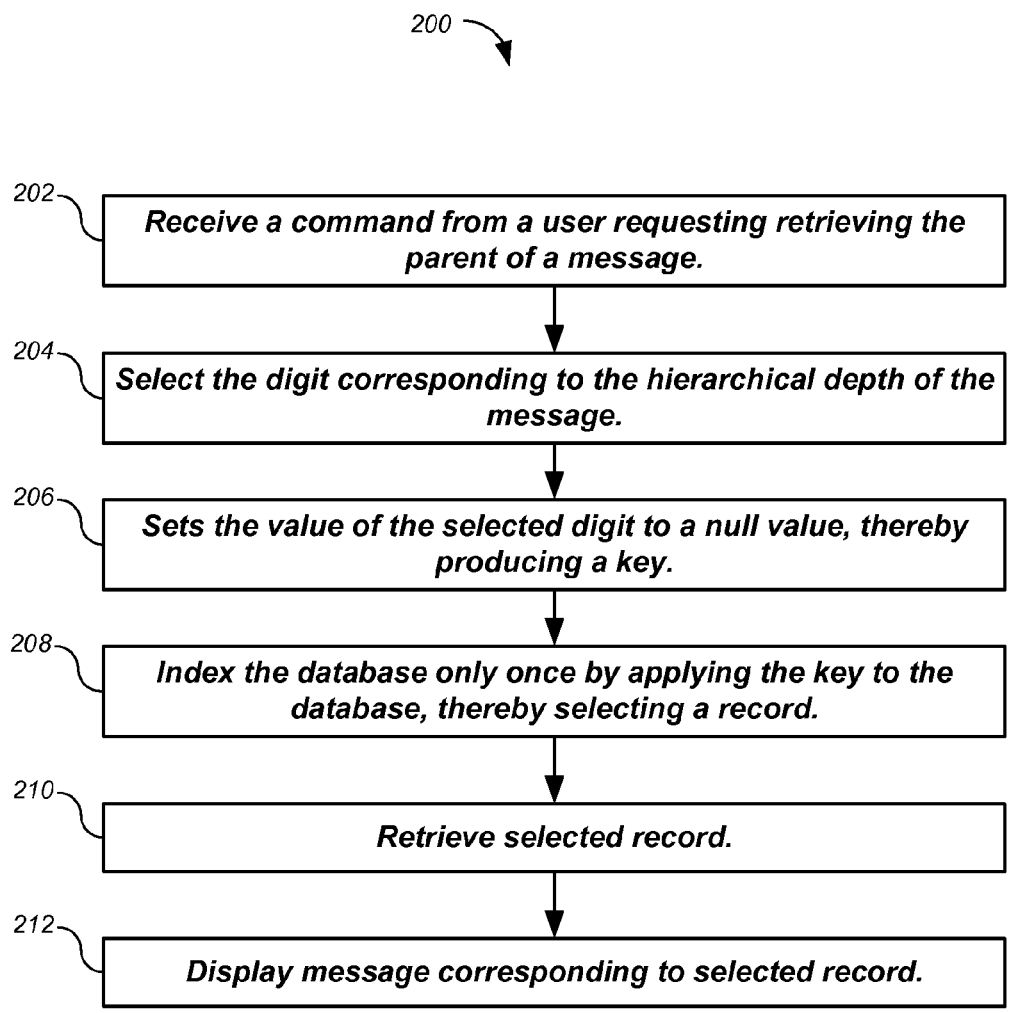
FIG. 2 is a flowchart of a process for retrieving the parent of a message in an indented threaded discussion according to one implementation.

FIG. 2 is a flowchart of a process 200 for retrieving the parent of a message in an indented threaded discussion according to one implementation. Process 200 receives a command from a user (step 202). The command identifies message 108 and requests retrieving the parent of message 108. Process 200 modifies the tag of message 108 to produce a key. To do this, process 200 first selects the digit corresponding to the hierarchical depth of message 108 (step 204). Referring to Table 1, message 108 has a depth of three. Therefore, process 200 selects the third most significant digit of the tag of message 108. The depth of each message need not be stored in the table, but can be determined in real time, with knowledge of the hierarchical depth represented by each digit. Where tags have digits arranged according to increasing depths in the hierarchy, such as the tags of Table 1, one can select the digit corresponding to the hierarchical depth of a message by simply select the least significant non-zero digit.

Process 200 then sets the value of the selected digit to a null value (step 206). In the tags of Table 1, the null value is zero. Of course, other values can be selected as the null value. The resulting key is "1100", which is the tag of message 106, the parent of message 108. Process 200 then indexes the database only once by applying the key to the database (step 208), thereby selecting the record for message 106. Process 200 then retrieves message 106 (step 210) and displays message 106 to the user (step 212).

Figure 3:
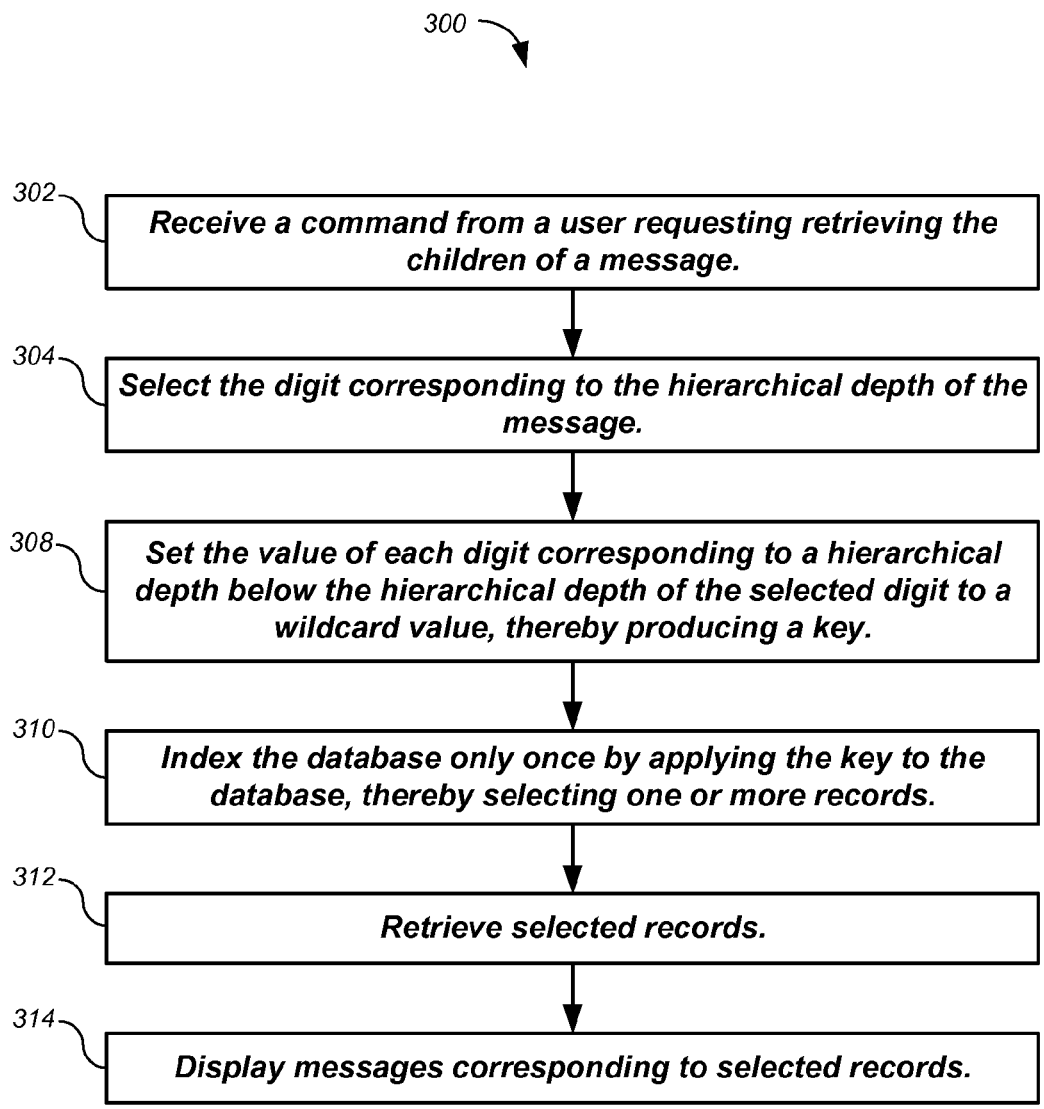
FIG. 3 is a flowchart of a process for retrieving the children of a message in an indented threaded discussion according to one implementation.

FIG. 3 is a flowchart of a process 300 for retrieving the children of a message in an indented threaded discussion according to one implementation. Process 300 receives a command from a user (step 302). The command identifies message 104 and requests retrieving all of the messages in the thread for which message 104 is the head. These messages include the children of message 104, the children of the children of message 104, and so on.

Process 300 modifies the tag of message 104 to produce a key. To do this, process 300 first selects the digit corresponding to the hierarchical depth of message 104 (step 304). Referring to Table 1, message 104 has a depth of one. Therefore, process 300 selects the most significant digit of the tag of message 104. Process 300 then sets the value of each digit corresponding to a hierarchical depth below the hierarchical depth of the selected digit to a wildcard value (step 308). The resulting key is "1XXX", where "X" represents a wildcard value that can match any value.

In one implementation, applying a key to the database selects all records in the database having tags that match the key. Process 300 indexes the database only once by applying the key to the database (step 310), thereby selecting the records for the messages in the thread headed by message 104. Referring to Table 1, the key "1XXX" matches the tags for records corresponding to messages 106 and 108. Process 300 then retrieves messages 106 and 108 (step 312) and displays messages 106 and 108 to the user (step 314).

Process 300 can also be used to delete a message. When a message is deleted, so are all of its children. Process 300 selects a message and all of its children. The records corresponding to the selected messages are then deleted.

Figure 4:
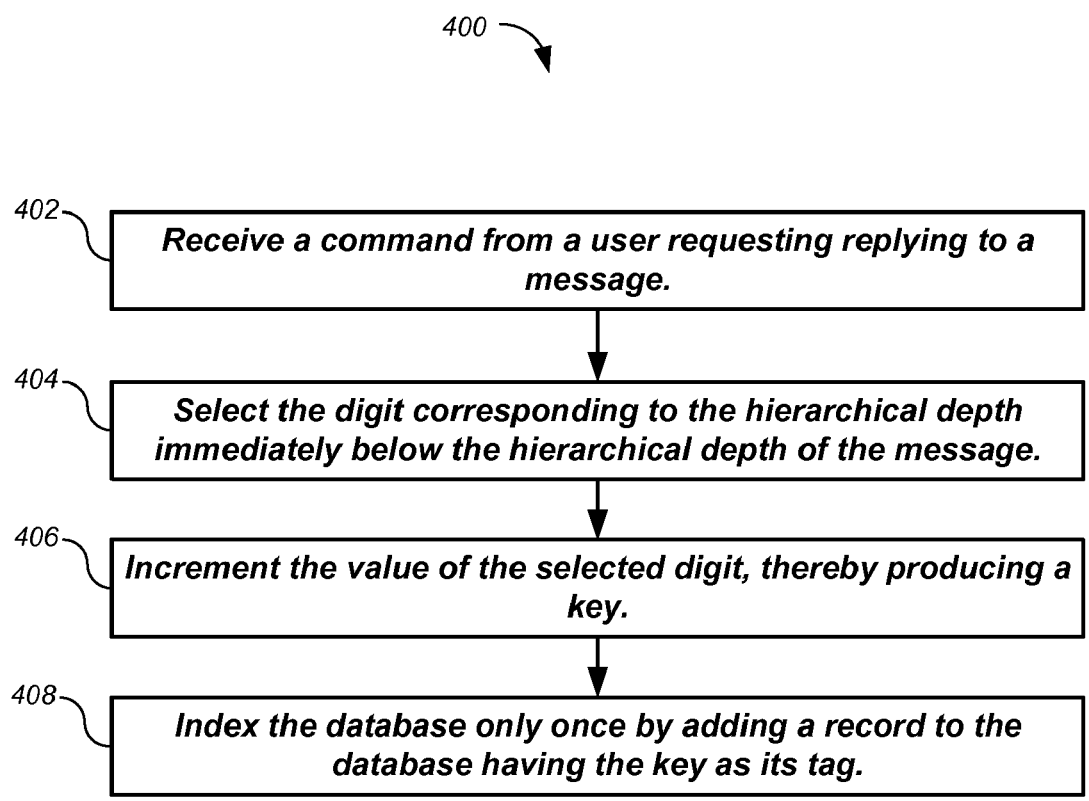
FIG. 4 is a flowchart of a process for adding a message to an indented threaded discussion according to one implementation.

FIG. 4 is a flowchart of a process 400 for adding a message to an indented threaded discussion according to one implementation. Process 400 receives a command from a user (step 402). The command identifies message 114 and requests replying to message 114. Process 400 modifies the tag of message 114 to produce a key. To do this, process 400 first selects the digit corresponding to the hierarchical depth immediately below the hierarchical depth of message 114 (step 404). Referring to Table 1, message 114 has a depth of two. Therefore, process 400 selects the third most significant digit of the tag of message 104. Process 400 then increments the value of selected digit (step 406). The resulting key is "3110". Process 400 then indexes the database only once by adding a record to the database having the key as its tag (step 408). The record corresponds to the new message.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

The invention claimed is:

1. A method of tagging a message or container in a hierarchical data set having a plurality of hierarchical levels and a plurality of hierarchical depths, the method comprising:

presenting with a data storage system a first message of an indented threaded discussion;

determining with the data storage system a hierarchical level of the first message within the indented threaded discussion;

determining with the data storage system a hierarchical depth of the first message within the indented threaded discussion;

assigning with the data storage system a first tag to the first message, comprising:

determining the immediate parent of the first message;

selecting a parent tag of the immediate parent of the first message, wherein the parent tag is a number having multiple digits each representing one of the hierarchical depths of the hierarchical data set;

selecting a digit of the selected parent tag that represents the hierarchical depth of the first message within the indented threaded discussion; and assigning a value to the selected digit, the value representing the hierarchical level of the first message within the indented threaded discussion; and storing an entry in a table of a database with the data storage system, said table entry including the assigned first tag, the selected digit representing the hierarchical depth within the indented threaded discussion, the assigned value representing the hierarchical level within the indented threaded discussion, and the first message.

2. The method of claim 1, further comprising:

receiving with the data storage system a command from a user requesting replying to the first message;

selecting the digit corresponding to the hierarchical depth immediately below the hierarchical depth of the first message with the data storage system;

incrementing the value of the selected digit with the data storage system, thereby producing a key; and indexing the database with the data storage system by adding a record to the database having the key as its tag and corresponding to a reply message from the user.

3. The method of claim 1, wherein assigning a value to the selected digit comprises:

determining the number of children of the immediate parent of the first message that have already been tagged;

incrementing the number of children to obtain an incremented number; and setting the value of the selected digit to equal the value of the incremented number.

4. At least one computer including a processor programmed to execute a process for tagging a message in a hierarchical data set having a plurality of hierarchical levels and a plurality of hierarchical depths, the process comprising:

presenting a first message of an indented threaded discussion;

determining a hierarchical level of the first message within the indented threaded discussion;

determining a hierarchical depth of the first message within the indented threaded discussion;

assigning a first tag to the first message, comprising:

determining the immediate parent of the first message;

selecting a parent tag of the immediate parent of the first message, wherein the parent tag is a number having multiple digits each representing one of the hierarchical depths of the hierarchical data set;

selecting a digit of the selected parent tag that represents the hierarchical depth of the first message within the indented threaded discussion; and assigning a value to the selected digit, the value representing the hierarchical level of the first message within the indented threaded discussion; and storing an entry in a table of a database, said table entry including the assigned first tag, the selected digit representing the hierarchical depth within the indented threaded discussion, the assigned value representing the hierarchical level within the indented threaded discussion, and the first message.

5. The at least one computer of claim 4, the process further comprising:

receiving a command from a user requesting replying to the first message;

selecting the digit corresponding to the hierarchical depth immediately below the hierarchical depth of the first message;

incrementing the value of the selected digit, thereby producing a key; and indexing the database by adding a record to the database having the key as its tag and corresponding to a reply message from the user.

6. The computer of claim 4, wherein assigning a value to the selected digit comprises:

determining the number of children of the immediate parent of the first message that have already been tagged;

incrementing the number of children to obtain an incremented number; and setting the value of the selected digit to equal the value of the incremented number.

7. An apparatus including a processor for tagging a message in a hierarchical data set having a plurality of hierarchical levels and a plurality of hierarchical depths, the apparatus further comprising means for presenting a first message of an indented threaded discussion;

means for determining a hierarchical level of the first message within the indented threaded discussion;

means for determining a hierarchical depth of the first message within the indented threaded discussion;

means for assigning a first tag to the first message, comprising:

means for determining the immediate parent of the first message;

means for selecting a parent tag of the immediate parent of the first message, wherein the parent tag is a number having multiple digits each representing one of the hierarchical depths of the hierarchical data set;

means for selecting a digit of the selected parent tag that represents the hierarchical depth of the first message within the indented threaded discussion; and means for assigning a value to the selected digit, the value representing the hierarchical level of the first message within the indented threaded discussion; and means for storing an entry in a table of a database, said table entry including the assigned first tag, the selected digit representing the hierarchical depth within the indented threaded discussion, the assigned value representing the hierarchical level within the indented threaded discussion, and the first message.

8. The apparatus of claim 7, further comprising:

means for receiving a command from a user requesting replying to the first message;

means for selecting the digit corresponding to the hierarchical depth immediately below the hierarchical depth of the first message;

means for incrementing the value of the selected digit, thereby producing a key; and means for indexing the database by adding a record to the database having the key as its tag and corresponding to a reply message from the user.

9. The apparatus of claim 7, wherein means for assigning a value to the selected digit comprises:

means for determining the number of children of the immediate parent of the first message that have already been tagged;

means for incrementing the number of children to obtain an incremented number; and means for setting the value of the selected digit to equal the value of the incremented number.

10. Computer-readable media embodying instructions executable by a computer including a processor to perform a method for tagging a message in a hierarchical data set having a plurality of hierarchical levels and a plurality of hierarchical depths, the method comprising:

presenting a first message of an indented threaded discussion;

determining a hierarchical level of the first message within the indented threaded discussion;

determining a hierarchical depth of the first message within the indented threaded discussion;

assigning a first tag to the first message, comprising:

determining the immediate parent of the first message;

selecting a parent tag of the immediate parent of the first message, wherein the parent tag is a number having multiple digits each representing one of the hierarchical depths of the hierarchical data set;

selecting a digit of the selected parent tag that represents the hierarchical depth of the first message within the indented threaded discussion; and assigning a value to the selected digit, the value representing the hierarchical level of the first message within the indented threaded discussion; and storing an entry in a table of a database, said table entry including the assigned first tag, the selected digit representing the hierarchical depth within the indented threaded discussion, the assigned value representing the hierarchical level within the indented threaded discussion, and the first message.

11. The media of claim 10, the method further comprising:

receiving a command from a user requesting replying to the first message;

selecting the digit corresponding to the hierarchical depth immediately below the hierarchical depth of the first message;

incrementing the value of the selected digit, thereby producing a key; and indexing the database by adding a record to the database having the key as its tag and corresponding to a reply message from the user.

12. The media of claim 10, wherein assigning a value to the selected digit comprises:

determining the number of children of the immediate parent of the first message that have already been tagged;

incrementing the number of children to obtain an incremented number; and setting the value of the selected digit to equal the value of the incremented number.

* * * * *

UNITED STATES PATENT AND TRADEMARK OFFICE
CERTIFICATE OF CORRECTION

PATENT NO. : 7,653,660 B2  Page 1 of 1
APPLICATION NO. : 11/617727
DATED : January 26, 2010
INVENTOR(S) : Kurt Frieden et al.

It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 423 days.

In column 4, line 35, after "table" insert -- . --.

In column 8, line 37, in claim 7, after "comprising" insert -- : --.

Signed and Sealed this

Fourteenth Day of September, 2010

David J. Kappos
*Director of the United States Patent and Trademark Office*